Jan. 15, 1963  J. J. BRYANT  3,072,947
ROTARY WIPER IMPROVEMENTS
Filed Dec. 23, 1959
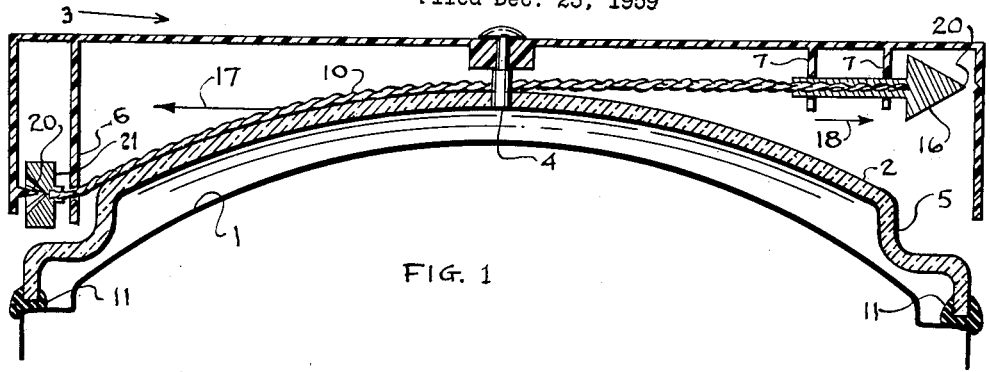
FIG. 1
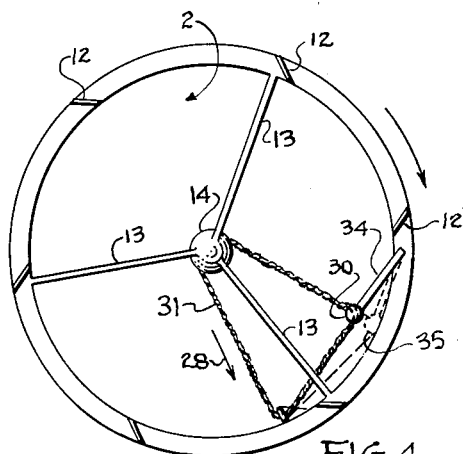
FIG. 4
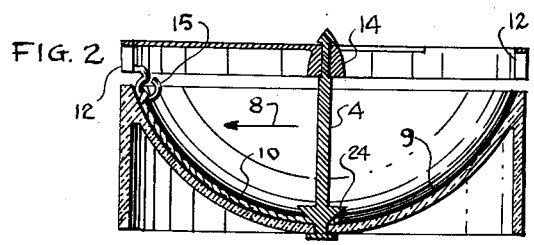
FIG. 2
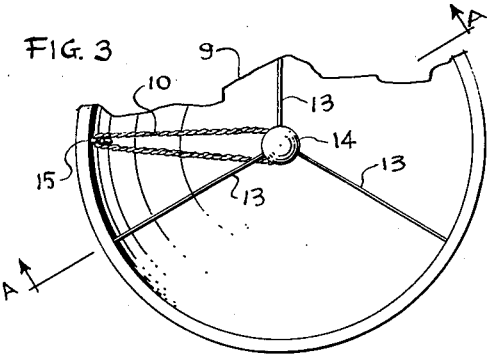
FIG. 3
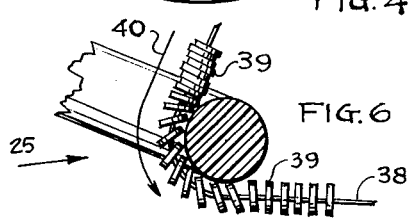
FIG. 5   FIG. 6
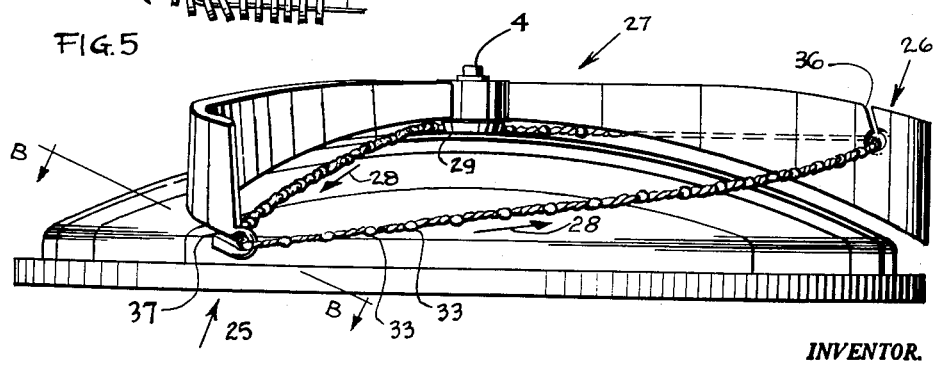
INVENTOR.
BY  John J. Bryant

3,072,947
ROTARY WIPER IMPROVEMENTS
John J. Bryant, Winnetka, Ill.
(359 Hawthorn St., Glen Ellyn, Ill.)
Filed Dec. 23, 1959, Ser. No. 861,720
5 Claims. (Cl. 15—250.2)

The object of this invention is to inhibit the depositing of dirt on certain types of surfaces which must be kept clean for optical purposes.

Another object is to keep the surfaces clean continuously while they are in use and to do this without interfering in an intolerable degree with the light involved.

More particularly, this invention relates to an improvement means over a former invention of mine, entitled Rotary Wiper, U.S. Patent No. 2,884,656. In the rotary wiper, certain adverse effects due to centrifugal force on the cleaning element are herein overcome by special distribution of rotating mass acting upon the element.

Where optical surfaces are bathed in moving air, as in the instance of the windshield or headlight of a moving vehicle, they will collect dirt more or less continually. When a windshield collects rain water, the viewer is aware of the optical distortion caused by the uneven water film on the glass. The rubber squeegee windshield wiper represents the displacement method of restoring the smooth glass surface. Since rubber is lubricated by water, the squeegee blade must apply considerable force with high driving power to penetrate the water film and keep intimate contact with the glass in order to remove the film. Due to this requirement for continuous contact and high unit pressure, the squeegee is not suited for the removal of solid dirt particles. The result of such use is the scratching of the glass, damage to the blade and inadequate cleaning action. Where large light transference is required through a small area, as in the instance of a headlight lens, removal of opaque and solid dirt is obviously important. A squeegee would defeat its purpose by blocking too much light from the headlight.

The driver is usually unaware of the gradual dirt collection on his headlights because the eye compensates for variations in light intensity. When he stops for fuel, the station attendant usually wipes the headlights only when asked to do so. He uses a rag.

In order to set forth the necessary dirt removal properties of a headlight wiper, an analysis of the cleaning properties of the rag is made. It contacts the dirt and removes it in a random fashion. Several sweeps are required to contact all points of the lens. This action is called Random Contact.

Another action is the absorption of moisture by the rag fibers, taking with them particles of dirt in clots. It is called Clotting. It will cause smearing of dirt if clean portions of the rag are not available to remove the remaining dirt from the glass by clotting.

Another action is called Dusting, which is the mechanical breaking of electrical and cementing bonds which hold dirt and salt crystals on the lens in the dry state.

This invention combines these three properties, at the expense of negligible light loss, in a thin, fibrous element adapted to rotate in contact with the lens surface.

In reference to the attached drawings, the following description clearly sets forth the necessary improvements in the rotary wiper:

FIGURE 1 illustrates one embodiment of the rotary wiper applied to a standard automobile headlight lens (shown in outline) including centrifugal tensioning means. Also shown is an improved bearing means for the ends of the cleaning element;

FIG. 2 is a cross section of FIG. 3 taken at line A—A, where

FIG. 3 is the front view of the wiper adapted to clean a concave lens;

FIG. 4 is a front view of the element employing an extra weight responsive to centrifugal force;

FIG. 5 is a side view of a curved vane rotor adapted to drive the belt type of element. Also illustrated are enlarged portions upon the belt for increasing the cleaning efficiency;

FIG. 6 illustrates a modification of the cleaning element which renders it more flexible and increases its cleaning efficiency.

Because sealed-beam headlamps 1 (shown in outline) currently in use have projections on the lens surface, an overlay lens 2 must be provided to give a smooth surface which is symmetrical about the axis of rotation of the rotor. The rotor is generally designated by arrow 3. It provides a support means for the rotor shaft 4 and gives a recessed stepback 5 from the edge of the surface 2 to be cleaned. The latter allows the element 10 to contact and clean the outermost portion of the lens 2 by giving clearance for the outer support means 6 of the element 10. These features 4 and 5 should ultimately be incorporated in the headlight proper 1.

The choice of a convex lens surface 2 allows the elongated cleaning element 10 to apply force against it while being supported only at its ends.

FIG. 2 is a cross section of FIG. 3. In the case of a concave surface, it illustrates how the element 10 is loosely supported upon rotating fins 12 by means of hook 15. As the element 10 rotates, the centrifugal force indicated by, and acting in the direction of arrow 8, causes the element 10 to be forced against the concave surface 9.

FIG. 3 shows that the element in this case can be an endless belt rotating in the pulley groove 24 at the base of shaft 4. An inflated gasket 11 of foam rubber or plastic seals the edge of the overlay lens against the lamp 1 proper.

In FIG. 4, to provide the rotating force for the element 31, a series of air fins 12 are arranged in a ring around the periphery of the lens, thereby avoiding light blockage. Three thin tension spokes 13 connect the fins 12 to a hub, bearing and shaft 14 at the center of the lens about which the rotor rotates. Air pressure against the lens pushes radially against the fins, the action of which causes the rotor to spin. In a more elaborate installation, the rotor ring can be protected by a decorative perforated bezel which would allow free air passage through it. The bezel would be a part of the automobile trim or a separate attachment to the headlamp retaining frame. The flexibility of the tension spokes 13 overcomes the tendency of the bushing type of bearing to chatter. Roller bearings could be used to increase the service life and stability of the unit.

To overcome the centrifugal force which is indicated by arrow 17 in FIG. 1, that tends to pull the element away from the lens 2, a guided, movable weight 16 is attached to one of its ends. Centrifugal force 18 of the weight causes it to move out and to apply tension on the element 10 only while the rotor 3 spins, offsetting the pull-away of the element 10; automatically adjusting the cleaning force and running friction to the torque capacity of the rotor; eliminating the starting friction, allowing the element 10 to work at very low air speeds; giving a governing action which limits the top speed of the rotor 3. The weight 21 at the left hand end functions similarly.

By providing bearings 20 for the end supports 6 and 7 of the element 10, it is allowed to roll continuously. The bearings 20 are the compass-type, low-friction needle bearings. The weights 16 and 21 slide outward through guides 6 and 7 on the rotor 3 to engage their respective needle seats 20 because of centrifugal force 18. Thus, tension is applied on the element as the speed increases; random contact is increased due to "differential rolling," i.e., the outer portion of the element 10, traversing a greater distance over the lens 2, rolls more than the inner portion. The accompanying vibratory actions are sharp as the element winds up and unwinds, snapping and dusting off dirt which has dried on the lens. Wet dirt is alternately absorbed and wrung out and spun off.

By extending the element 10 both directions beyond its extreme points of tangency with the lens, it is allowed to roll and to present its total surface to the lens at all points of contact on the lens, avoiding clotting at the ends of the element and resultant smear; assuring its twisting and self-cleaning; in general, giving better random contact.

Because of the shortening of the element caused by twisting and the end-play of the sliding bearings 20, a very desirable cleaning motion is apparent. This I call longitudinal movement. It is also caused by the frictional reaction of the lens portion near the shaft 4. Thus, the element is caused to move out and in along its own axis, thereby removing any rings of smear that form due to the clotting.

FIG. 5 illustrates a side view of the belt type of element. Here in order to best utilize the longitudinal movement, the ends of the element are, in effect, extended around the shaft 4 and connected together. Thus, assuming clockwise rotation of the rotor 27, the longitudinal movement is allowed to draw the element around like a pulley belt in the direction of arrows 28. Thus arranged so that it can slide through the outer supports generally designated by 25, 26, the following things are observed: Clots are carried out to the edge of the lens and spun off. Rings of dirt take the form of spirals of one revolution because the next revolution presents a different portion of the belt on the lens each time around. Wear distribution is ideal. Rolling and twisting and self-cleaning are unhindered because the belt rolls as it slides over its support means 25, 26.

Here a substantial portion of the belt is circulated near the periphery of the lens. The radial component of centrifugal force acting on this portion causes the belt automatically to tension itself. Dirt and water increase the cleaning force automatically by virtue of its added weight and greater centrifugal tensioning.

To insure that opening traction causes the belt to circulate relative to the rotor, a V groove 29 is fixed at the base of the rotor shaft 24. At operating speed the belt is pulled into the groove 29 and pushed against the glass, forcing it to slide through the outer support means 25, 26 and over the glass.

Referring to FIGURE 4, in smaller sized wipers it may be necessary to include a separate, movable, weight to tension the belt. The weight 30 or 16 could be a low mass, porous material which would absorb water when road conditions are wet, thereby increasing cleaning force in wet weather driving. The belt slides thru the weight 30 which is mounted on arm 34. 35 shows the outermost position of the weight when the rotor is spinning.

It was observed in tests of all the wiper elements that shrinkage appreciably tightened them in wet weather. This factor was used to advantage in increasing the service life of the belt where an extra centrifugal tensioning weight 30 was used. During dry road conditions the belt was long enough to slide through the weight when it was in the outermost position. Thus, the weight 30 had no effect on the tension of a dry belt 31. When the belt shrank, it pulled the weight 30 away from the outer stop. Then the weight could put the extra tension on the shrunken belt when it was most needed.

An improvement over the simple element was made by braiding it so as to give a series of knots 33. Several threads of nylon are wrapped around a form of proper circumference. With the last thread they are all braided together in a series of knots 33. By presenting fewer points of contact on the glass, it can concentrate its total contact force on a smaller net area. This increased the unit cleaning pressure nearly twenty times and proved valuable in removing dry salt deposits by adding a polishing action to its mopping action.

It was noted that an oily windshield is impossible to clean of water with the squeegee because the high surface tension of the water formed droplets. This phenomenon was found to be advantageous in the case of headlights. Silicone products such as Z4141 (Dow Corning) make a chemical and physical change in the glass surface, which imparts a water-repellent quality. Due to a lubricative character, it also raises the resistance of the glass to abrasion of the dirt. The lens thus treated caused any aqueous dirt suspension merely to form droplets, most of which rolled together and fell off, leaving many areas dry and clean. By thus keeping water in droplet form, its drying time is greatly lengthened due to its reduced area. The droplets are much more readily removed because the extra thickness makes them more easily contacted, absorbed and spun off by the element. Smearing cannot occur when the glass resists "wetting."

In all of the lopped elements it is necessary to provide guides through which the belt can slide without stalling, especially where knots make it irregular. Pulleys were used at first, but were not reliable nor necessary. The guides can be openings which are provided with slots 36, 37 which allow the loop element to be attached without breaking the continuity of the belt.

Other applications of this headlight wiper are obvious on tail lights, reflectors, marine lights, buoys, rear view mirrors, periscopes, goggles, wind shields, and other lenses provided with a suitable rotation means.

Suppleness of the element is an important factor, enabling it to perform its various movements at the expense of minimum energy.

FIG. 6 is an enlarged cross section taken on line B—B of FIG. 5. It illustrates a modification of the element which yields increased flexibility as well as greater dirt carrying capacity. The element consists of a thin cord 38 upon which many nylon washers 39 are strung in the manner of a string of beads. Arrow 40 indicates the direction in which the element moves as it slides over the light surface and over the outer support 25, FIGS. 5 and 6. As the washers pass over the surface before they reach the guide 25, they roll easily and in an irregular manner, collecting dirt between them by capillary action. When they reach the support 25, turn, and move toward the other support 26, they become separated and allow the dirt to be spun off to the side of the headlamp lens.

The use of thinner cord also simplifies the method of joining the ends in forming the belt shape. A modified necklace clamp can be employed, thus avoiding any bulges which might impede its circulation through the guides 25, 26.

The foregoing description demonstrates several operative embodiments of the centrifugal force means as it is applied to the rotary wiper element. It is to be understood that these and other improvemens included in this invention may be modified within the scope of the following claims.

What I claim is:

1. In a wiper for removing dirt from a light-pervious surface, a thin vibratile cleaning element having a portion engageable with the surface, rotatable means rotatable relative to the surface for supporting said element, means including said rotatable means for rotating said element realtive to said surface and for causing said element repetitively and intermittently to engage and slap the surface during said rotation, a mass supported upon said rotatable means and adapted to move away from the axis of said rotation in response to centrifugal force and to apply tension in said element causing said portion to tend to conform to a straight line through said support means during the rotation of said rotatable means.

2. In a wiper as claimed in claim 1, said element comprising an endless belt, said portion supported upon said rotatable means remote from the axis thereof and extending from said support means across the surface, wherein said mass reacts against the part of said belt not in contact with said surface thereby drawing said portion against said surface during the rotation of said rotatable means.

3. In a wiper as defined in claim 1, said rotatable means including a bob attached to the end of said element, a spindle bearing and guide means for guiding said bob into rotary engagement with said bearing.

4. In a wiper as defined in claim 1, said mass comprising a porous body capable of absorbing moisture deposited on the outer surface thereof to increase the centrifugal force on said mass.

5. In a wiper as defined in claim 2, said belt comprising a series of small perforated discs strung upon a flexible filament wherein said discs, responsive to centrifugal force, slide together collecting said dirt and become separated by said support means to release said dirt during the rotation of said rotatable means.

References Cited in the file of this patent

UNITED STATES PATENTS

| | | |
|---|---|---|
| 2,540,407 | Reed-Lethbridge | Feb. 6, 1951 |
| 2,749,568 | Bird et al. | June 12, 1956 |
| 2,842,446 | Beck | July 8, 1958 |
| 2,884,656 | Bryant | May 5, 1959 |
| 2,933,404 | Paolis | Apr. 19, 1960 |